(12) United States Patent
McCaffrey et al.

(10) Patent No.: US 8,790,067 B2
(45) Date of Patent: Jul. 29, 2014

(54) BLADE CLEARANCE CONTROL USING HIGH-CTE AND LOW-CTE RING MEMBERS

(75) Inventors: Michael G. McCaffrey, Windsor, CT (US); Eric A. Hudson, Harwinton, CT (US)

(73) Assignee: United Technologies Corporation, Hartford, CT (US)

(*) Notice: Subject to any disclaimer, the term of this patent is extended or adjusted under 35 U.S.C. 154(b) by 557 days.

(21) Appl. No.: 13/095,326

(22) Filed: Apr. 27, 2011

(65) Prior Publication Data

US 2012/0275898 A1 Nov. 1, 2012

(51) Int. Cl.
*F01D 11/18* (2006.01)
(52) U.S. Cl.
USPC .......................... 415/1; 415/173.3
(58) Field of Classification Search
CPC ........ F01D 11/025; F01D 11/08; F01D 11/18
USPC ................. 415/1, 173.1, 213.1, 214.1, 173.2, 415/173.3
See application file for complete search history.

(56) References Cited

U.S. PATENT DOCUMENTS

| | | | |
|---|---|---|---|
| 3,887,299 A | 6/1975 | Profant | |
| 4,008,978 A | 2/1977 | Smale | |
| 4,363,208 A | 12/1982 | Hoffman et al. | |
| 4,398,866 A | 8/1983 | Hartel et al. | |
| 4,527,385 A * | 7/1985 | Jumelle et al. | 60/806 |
| 4,573,320 A | 3/1986 | Kralick | |
| 4,596,116 A * | 6/1986 | Mandet et al. | 60/785 |
| 4,626,461 A | 12/1986 | Prewo et al. | |
| 4,759,687 A | 7/1988 | Miraucourt et al. | |
| 5,092,737 A | 3/1992 | Lau | |
| 5,299,914 A | 4/1994 | Schilling | |
| 5,392,596 A | 2/1995 | Holsapple et al. | |
| 5,466,122 A | 11/1995 | Charbonnel et al. | |
| 5,593,278 A * | 1/1997 | Jourdain et al. | 415/173.2 |
| 6,042,315 A | 3/2000 | Miller et al. | |
| 6,045,310 A | 4/2000 | Miller et al. | |
| 6,197,424 B1 | 3/2001 | Morrison et al. | |
| 6,200,092 B1 | 3/2001 | Koschier | |
| 6,241,471 B1 | 6/2001 | Herron | |
| 6,250,883 B1 | 6/2001 | Robinson et al. | |
| 6,325,593 B1 | 12/2001 | Darkins, Jr. et al. | |
| 6,451,416 B1 | 9/2002 | Holowczak et al. | |
| 6,514,046 B1 | 2/2003 | Morrison et al. | |

(Continued)

FOREIGN PATENT DOCUMENTS

GB 2250782 A 6/1992
WO 2010146288 A1 12/2010

OTHER PUBLICATIONS

Characterization of First-Stage Silicon Nitride Components After Exposure to an Industrial Gas Turbine H.-T. Lin,*,M. K. Ferber,* and P. F. Becher, J. R. Price, M. van Roode, J. B. Kimmel, and O. D. Jimenez J. Am. Ceram. Soc., 89 [1] 258-265 (2006).

(Continued)

*Primary Examiner* — Ned Landrum
*Assistant Examiner* — Liam McDowell
(74) *Attorney, Agent, or Firm* — Bachman & LaPointe, P.C.

(57) ABSTRACT

An engine has a blade stage and a circumferential array of blade outer air seal segments. A support ring carries the blade outer air seal segments. The support ring has a low-CTE member and a high-CTE member intervening between the blade outer air seal segments and the low-CTE member.

26 Claims, 5 Drawing Sheets

(56) References Cited

U.S. PATENT DOCUMENTS

| | | |
|---|---|---|
| 6,648,597 B1 | 11/2003 | Widrig et al. |
| 6,676,373 B2 | 1/2004 | Marlin et al. |
| 6,696,144 B2 | 2/2004 | Holowczak et al. |
| 6,709,230 B2 | 3/2004 | Morrison et al. |
| 6,733,233 B2 | 5/2004 | Jasklowski et al. |
| 6,746,755 B2 | 6/2004 | Morrison et al. |
| 6,758,386 B2 | 7/2004 | Marshall et al. |
| 6,758,653 B2 | 7/2004 | Morrison |
| 6,808,363 B2 | 10/2004 | Darkins, Jr. et al. |
| 6,854,738 B2 | 2/2005 | Matsuda et al. |
| 6,893,214 B2 | 5/2005 | Alford et al. |
| 6,896,483 B2 * | 5/2005 | Dierksmeier et al. ......... 415/138 |
| 6,910,853 B2 | 6/2005 | Corman et al. |
| 6,935,836 B2 | 8/2005 | Ress, Jr. et al. |
| 7,090,459 B2 | 8/2006 | Bhate et al. |
| 7,093,359 B2 | 8/2006 | Morrison et al. |
| 7,094,027 B2 | 8/2006 | Turner et al. |
| 7,114,917 B2 | 10/2006 | Legg |
| 7,117,983 B2 | 10/2006 | Good et al. |
| 7,153,096 B2 | 12/2006 | Thompson et al. |
| 7,198,454 B2 | 4/2007 | Evans |
| 7,198,458 B2 | 4/2007 | Thompson |
| 7,247,003 B2 | 7/2007 | Burke et al. |
| 7,278,830 B2 | 10/2007 | Vetters |
| 7,384,240 B2 | 6/2008 | McMillan et al. |
| 7,434,670 B2 | 10/2008 | Good et al. |
| 7,435,058 B2 | 10/2008 | Campbell et al. |
| 7,452,182 B2 | 11/2008 | Vance et al. |
| 7,452,189 B2 | 11/2008 | Shi et al. |
| 7,488,157 B2 | 2/2009 | Marini et al. |
| 7,491,032 B1 | 2/2009 | Powell et al. |
| 7,497,662 B2 | 3/2009 | Mollmann et al. |
| 7,510,379 B2 | 3/2009 | Marusko et al. |
| 7,534,086 B2 | 5/2009 | Mazzola et al. |
| 7,546,743 B2 | 6/2009 | Bulman et al. |
| 7,579,085 B2 * | 8/2009 | Hazel ........................ 428/446 |
| 7,600,970 B2 | 10/2009 | Bhate et al. |
| 7,647,779 B2 | 1/2010 | Shi et al. |
| 7,648,336 B2 | 1/2010 | Cairo |
| 7,665,960 B2 | 2/2010 | Shi et al. |
| 7,686,575 B2 * | 3/2010 | Chehab et al. ............... 415/136 |
| 7,722,317 B2 * | 5/2010 | Schiavo et al. ............... 415/138 |
| 7,726,936 B2 | 6/2010 | Keller et al. |
| 7,753,643 B2 | 7/2010 | Gonzalez et al. |
| 7,762,768 B2 | 7/2010 | Shi et al. |
| 7,771,160 B2 | 8/2010 | Shi et al. |
| 7,785,076 B2 | 8/2010 | Morrison et al. |
| 7,824,152 B2 | 11/2010 | Morrison |
| 2005/0158171 A1 | 7/2005 | Carper et al. |
| 2005/0254942 A1 | 11/2005 | Morrison et al. |
| 2007/0072007 A1 | 3/2007 | Carper et al. |
| 2008/0034759 A1 | 2/2008 | Bulman et al. |
| 2009/0260364 A1 * | 10/2009 | Keller et al. ................... 60/753 |
| 2010/0021290 A1 | 1/2010 | Schaff et al. |
| 2010/0032875 A1 | 2/2010 | Merrill et al. |
| 2010/0111678 A1 | 5/2010 | Habarou et al. |
| 2010/0226760 A1 | 9/2010 | McCaffrey |
| 2010/0257864 A1 | 10/2010 | Prociw et al. |
| 2011/0027098 A1 | 2/2011 | Noe et al. |
| 2011/0052384 A1 | 3/2011 | Shi et al. |

OTHER PUBLICATIONS

Evaluation of Mechanical Stability of a Commercial Sn88 Silicon Nitride at Intermediate Temperatures Hua-Tay Lin,* Mattison K. Ferber,* and Timothy P. Kirkland*, J. Am. Ceram. Soc., 86 [7] 1176-81 (2003).

Research and Development of Ceramic Turbine Wheels, K. Watanab, M. Masuda T. Ozawa, M. Matsui, K. Matsuhiro, 36 I vol. 115, Jan. 1993, Transactions of the ASME.

A.L. Neuburger and G. Carrier, Design and Test of Non-rotating Ceramic Gas Turbine Components, ASME Turbo Expo 1988, ASME paper 88-GT-146.

Vedula, V., Shi, J., Liu, S., and Jarmon, D. "Sector Rig Test of a Ceramic Matrix Composite (CMC) Combustor Liner", GT2006-90341, Proceedings of GT2006, ASME turbo Expo 2006: Power for Land, Sea and Air, Barcelona, Spain, May 8-11, 2006.

Bhatia, T., "Enabling Technologies for Hot Section Components", Contract N00014-06-C-0585, Final Report, Jan. 30, 2009.

Vedula, V., et al., "Ceramic Matrix Composite Turbine Vanes for Gas Turbine Engines", ASME Paper GT2005-68229, Proceedings of ASME Turbo Expo 2005, Reno, Nevada, Jun. 6-9, 2005.

Verrilli, M., Calamino, A., Robinson, R.C., and Thomas, D.J., "Ceramic Matrix Composite Vane Subelement Testing in a Gas Turbine Environment", Proceedings of ASME Turbo Expo 2004, Power for Land, Sea, and Air, Jun. 14-17, 2004, Vienna, ASME Paper GT2004-53970.

Watanbe, K., Suzumura, N., Nakamura, T., Murata, H., Araki, T., and Natsumura, T., "Development of CMC Vane for Gas Turbine Engine", Ceramic Engineering and Science Proceedings, vol. 24, Issue 4, 2003, pp. 599-604.

Calamino, A. and Verrilli, M., "Ceramic Matrix Composite Vane Subelement Fabrication", Proceedings of ASME Turbo Expo 2004, Power for Land, Sea, and Air, Jun. 14-17, 2004, Vienna, ASME Paper GT2004-53974.

Bhatia, T., et al., "CMC Combustor Line Demonstration in a Small Helicopter Engine", ASME Turbo Expo 2010, Glasgow, UK, Jun. 14-18, 2010.

* cited by examiner

BLADE CLEARANCE CONTROL USING HIGH-CTE AND LOW-CTE RING MEMBERS

BACKGROUND

The disclosure relates to blade clearance in turbomachinery. More particularly, the disclosure relates to control via thermal properties of shroud support rings.

Gas turbine engines may contain rotating blade stages in fan, compressor, and/or turbine sections of the engine. Clearance between blade tips and the adjacent non-rotating structure may influence engine performance. Clearance may be influenced by mechanical loading (e.g., radial expansion of the blades and/or their supporting disks due to speed-dependent centrifugal loading) and thermal expansion (e.g., of the blades/disks on the one hand and the non-rotating structure on the other).

The high temperatures of the turbine section(s) make clearance issues particularly significant due both to: (1) the greater significance of thermal expansion; and (2) temperature-induced modulus reduction which exacerbates expansion from mechanical loading. In multi-spool engines, this will be particularly significant in the high speed/pressure turbine section of the engine. This may be particularly significant in the engines of combat aircraft which may be subject to greater and more rapid variations in speed and other operating conditions than are the engines of civil aircraft.

Accordingly, a variety of clearance control systems have been proposed.

To provide active control, many proposed systems form the non-rotating structure with a circumferential array of blade outer air seal (BOAS) segments mounted for controlled radial movement (e.g., via actuators such as electric motors or pneumatic actuators). An aircraft or engine control system may control the movement to maintain a desired clearance between the inner diameter (ID) faces of the BOAS segments and the blade tips.

Additionally, various proposed systems have involved tailoring the physical geometry and material properties of the BOAS support structure to tailor the thermal expansion of the support structure to provide a desired clearance when conditions change. Such thermal systems may be passive. Alternatively, such thermal systems may involve an element of active control such as via controlled direction of cooling air to the support structure.

Proposals for thermal expansion-based systems have included systems wherein the BOAS support structure comprises two distinct materials having different coefficients of thermal expansion (CTE) and dimensioned and positioned relative to each other to provide a staged expansion wherein the relative influence of each of the two materials changes over the range of operation. One example of such a system is found in U.S. Pat. No. 5,092,737.

SUMMARY

One aspect of the disclosure involves an engine having a blade stage and a circumferential array of blade outer air seal segments. A support ring carries the blade outer air seal segments. The support ring has a low-CTE (e.g., nonmetallic member) and a high-CTE (e.g., metallic member) intervening between the blade outer air seal segments and the low-CTE member.

In various implementations, the metallic member and non-metallic member have dimensions and physical properties so that over an operational temperature range there are distinct stages in which the circumferential thermal expansion of one member versus the other dictate radial expansion of the circumferential array of blade outer air seal segments.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
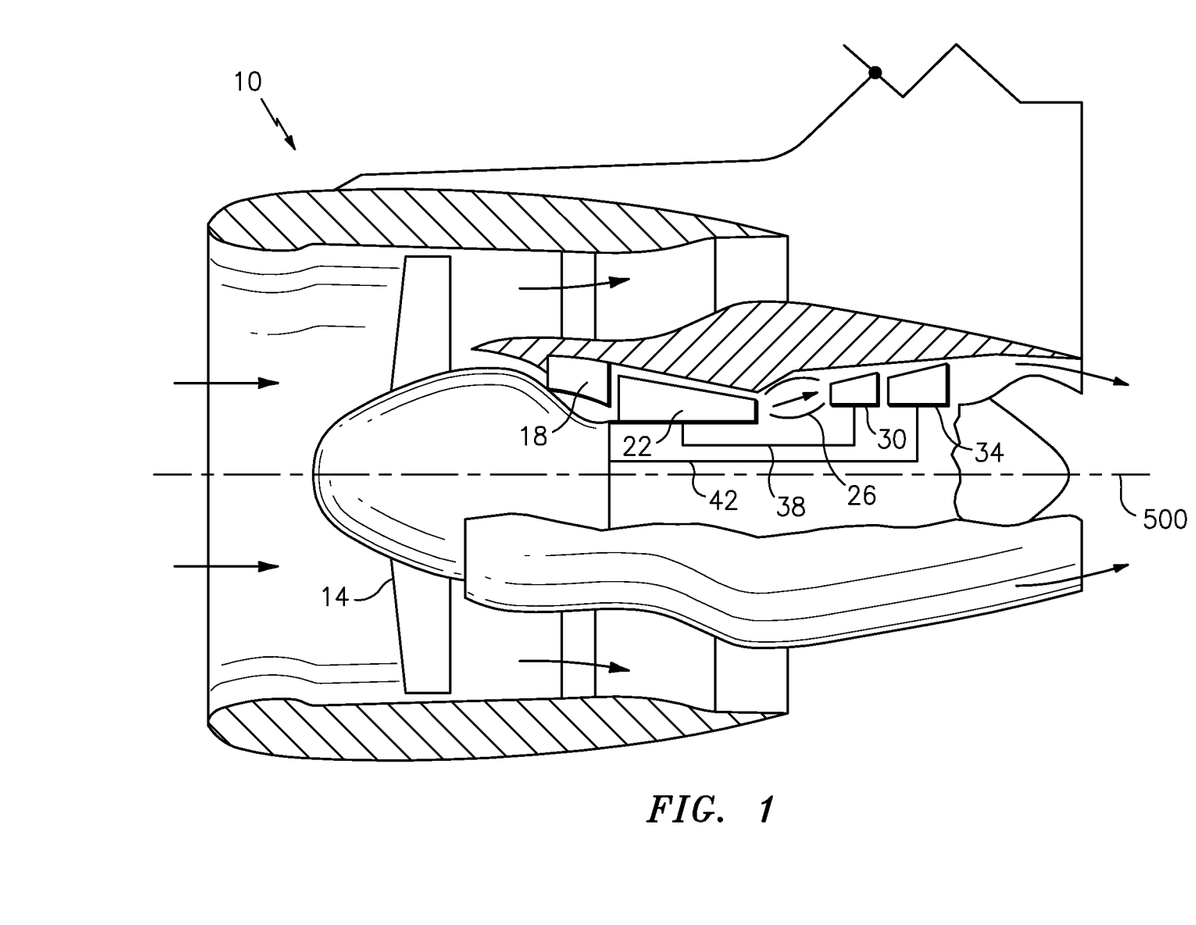
FIG. 1 is a partially schematic axial sectional/cutaway view of a gas turbine engine.

FIG. 1 schematically illustrates an exemplary gas turbine engine 10 including (in serial flow communication from upstream to downstream and fore to aft) a fan section 14, a low-pressure compressor (LPC) section 18, a high-pressure compressor (HPC) section 22, a combustor 26, a high-pressure turbine (HPT) section 30, and a low-pressure turbine (LPT) section 34. The gas turbine engine 10 is circumferentially disposed about an engine central longitudinal axis or centerline 500. During operation, air is: drawn into the gas turbine engine 10 by the fan section 14; pressurized by the compressors 18 and 22; and mixed with fuel and burned in the combustor 26. The turbines 30 and 34 then extract energy from the hot combustion gases flowing from the combustor 26.

In a two-spool (two-rotor) design, the blades of the HPC and HPT and their associated disks, shaft, and the like form at least part of the high speed spool/rotor and those of the LPC and LPT form at least part of the low speed spool/rotor. The fan blades may be formed on the low speed spool/rotor or may be connected thereto via a transmission. The high-pressure turbine 30 utilizes the extracted energy from the hot combustion gases to power the high-pressure compressor 22 through a high speed shaft 38. The low-pressure turbine 34 utilizes the extracted energy from the hot combustion gases to power the low-pressure compressor 18 and the fan section 14 through a low speed shaft 42. The teachings of this disclosure are not limited to the two-spool architecture. Each of the LPC, HPC, HPT, and HPC comprises interspersed stages of blades and vanes. The blades rotate about the centerline with the associated shaft while the vanes remain stationary about the centerline.

Figure 2:
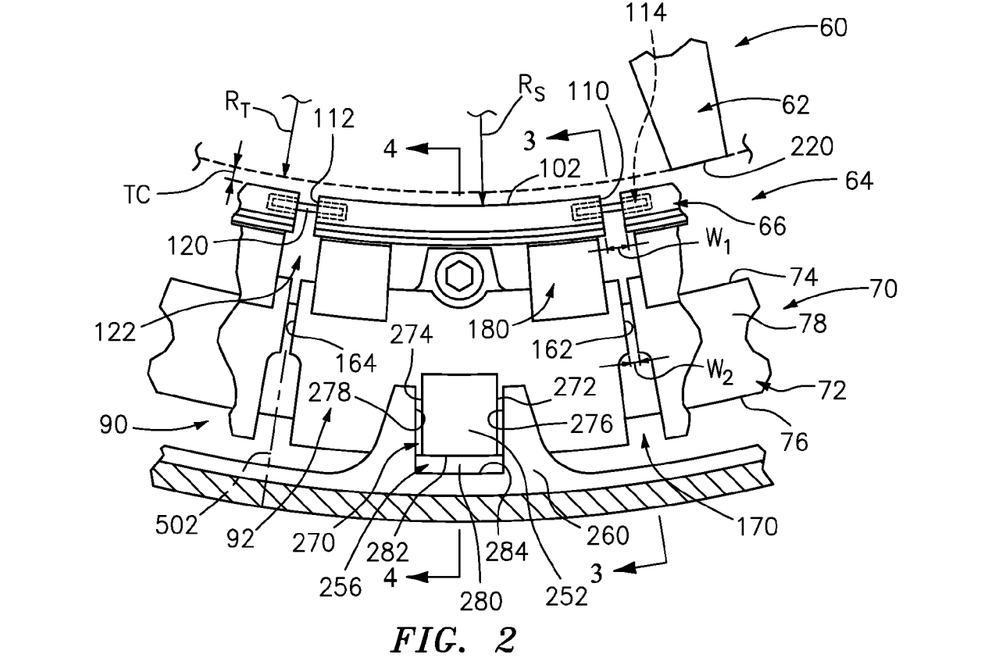
FIG. 2 is a partial front view of a stage of air seal segments of a turbine section of the engine of FIG. 1.

FIG. 2 shows one of the stages 60 of blades 62 and its associated array 64 of blade outer air seal (BOAS) segments 66 (e.g., of the HPT). The segments locally bound the radially outboard extreme of the core flowpath through the engine. The segments are supported on a support ring structure 70. The support ring is subject to thermal expansion. With a monolithic support ring, the coefficient of thermal expansion (CTE) of the ring material will influence radial thermal expansion of the ring, and thus of the inner diameter (ID)

faces of the BOAS segments. Such expansion, relative to combined thermal and centrifugal expansion of the associated rotor at the blade tips, dictates the change in tip clearance. High CTE materials would include alloys such as nickel-based superalloys (e.g., Inco 718). These have an exemplary CTE range of at least 3.0 ppm/C (more narrowly 3.0-4.0 ppm/C or 3.5-4.0 ppm/C). Low CTE materials include ceramics and ceramic matrix composites (CMC) and have an exemplary CTE range of up to 2.5 ppm/C (more narrowly, up to 2.0 ppm/C or 0.5-2.0 ppm/C or, for exemplary CMCs, 0.5-1.0 ppm/C). As a practical matter, the low CTE material will have a much lower thermal conductivity than the high CTE material. Thermal conductivity will have a substantial influence in view of transient behaviors. For example, with rapid changes in engine speed/power, centrifugal effects on tip radius may occur before a corresponding temperature change has full influence on the ring. The delay is more significant with lower conductivity rings. For example, a rapid acceleration or deceleration may cause departures from the equilibrium situation. There are other metallic low-CTE materials that could be used. One example is gamma titanium. An exemplary CTE for this is about 2 ppm/C.

For example, combat aircraft may be subject to rapid acceleration from cruise conditions. Evidencing the complexity of the problem, such an acceleration could be from a steady-state cruise condition or could be a reburst wherein the engine had been operating close to full speed/power long enough for temperature to depart from equilibrium cruise conditions whereafter the engine decelerates back to a cruise speed and before the engine can re-equilibrate, reaccelerates. Accordingly, the engine may be designed with anticipated non-equilibrium situations in mind.

Figure 6:
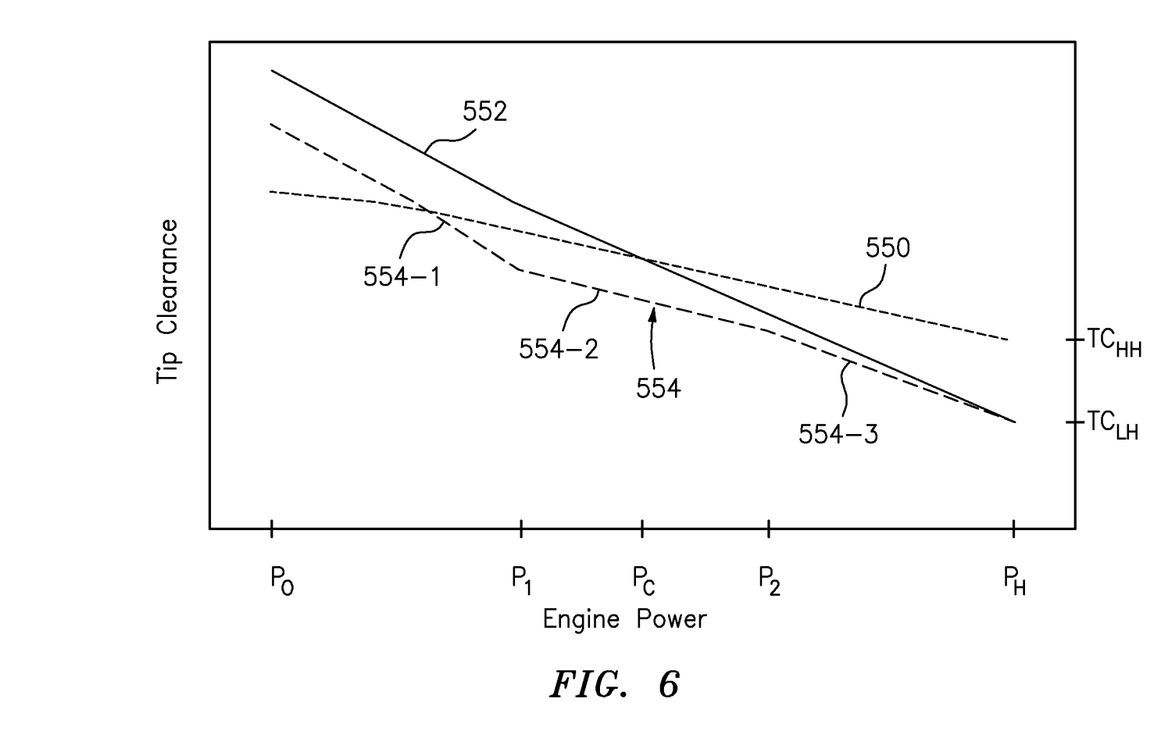
FIG. 6 is a plot of tip clearance vs. engine power.

FIG. 6 shows simplified plots of tip clearance versus engine power at fully equilibrated or steady-state conditions. A first plot 550 reflects a hypothetical high CTE ring. A second plot 552 reflects a hypothetical low CTE ring. An exemplary lowest illustrated power level $P_0$ may be an idle level. An exemplary highest illustrated power level $P_H$ may be a take-off power level. FIG. 6 further shows an exemplary cruise power level $P_C$. The particular plots 550 and 552 illustrated for the two ring properties are dictated by transient behaviors. In general, the tip clearance will decrease with power because: (1) the rotor is subject to both thermal expansion and centrifugal/inertial expansion, whereas the ring is subject only to thermal expansion; and (2) the exemplary blade and disk materials have relatively high CTE so there is not much chance to use a sufficiently higher CTE ring material to counter the centrifugal/inertial expansion.

If no transients were involved, the rings could be sized so that there was essentially zero clearance at the maximum anticipated power. To the extent that the high CTE ring would tend to thermally expand at a rate closer to the thermal expansion rate of the rotor, it would have much lower/tighter clearance as power decreased from maximum compared with a low CTE ring. However, transient behavior imposes different requirements on low CTE rings versus high CTE rings. One example of a transient situation is a rapid deceleration from take-off power followed by a reacceleration. During the rapid deceleration, the low CTE ring will contract more slowly than the high CTE ring (due to the associated lower thermal conductivity). There must be sufficient steady-state/equilibrium clearance at high power to compensate for the contraction of the ring during this important transient period. Thus, the steady-state clearance of the high CTE ring must be greater at high power conditions than that of the low CTE ring. Thus, if the high CTE plot 550 were selected to be lower (e.g., of similar slope but having the same high power steady-state clearance as the low CTE plot) then there would be a pinch or rub situation in the transient. Assuming abradable coatings or materials, such a pinch/rub would promptly abrade material to increase clearance and reset the plot 550 to the higher level illustrated.

These two exemplary clearances are shown in FIG. 6 as $TC_{HH}$ and $TC_{LH}$, respectively. Working back to low power from this condition, the thermal conductivities of the rings dictate the slopes of the plots 550 and 552. The resulting situation is that the plots 550 and 552 intersect at an intermediate power (in the exemplary case near cruise but not necessarily so). At steady-state/equilibrium conditions, there are similar clearances and thus similar efficiencies at this intermediate power. At higher power, the clearance associated with the high CTE ring is greater and thus there is less efficiency than with the low CTE ring. Similarly, at lower power, the clearance is greater with the low CTE ring and thus there is lower efficiency with the low CTE ring than with the high CTE ring.

However, as is discussed below, there may be several opportunities for using a hybrid ring which includes both high CTE material and low CTE material. During different stages of operation, expansion of the hybrid ring is influenced in substantially differing proportions from the two (or more) materials. As one example, plot 554 shows a hypothetical system which has three stages of operation: a low power stage 554-1 up to a power $P_1$ has behavior relatively heavily influenced by the low CTE material; an intermediate power range 554-2 has behavior more heavily influenced by the high CTE material; and an upper power range 554-3 above a power $P_2$ has behavior influenced by both (e.g., reflecting a weighted average CTE of the two CTE materials; additionally the relative hoop stiffness of the low CTE ring 72 in tension, and compressive stiffness of the high CTE carriers 92, will further determine the behavior of the system. In the illustrated example the slope is about average of the slope associated with the low CTE material and the slope associated with the high CTE material.

Figure 7:
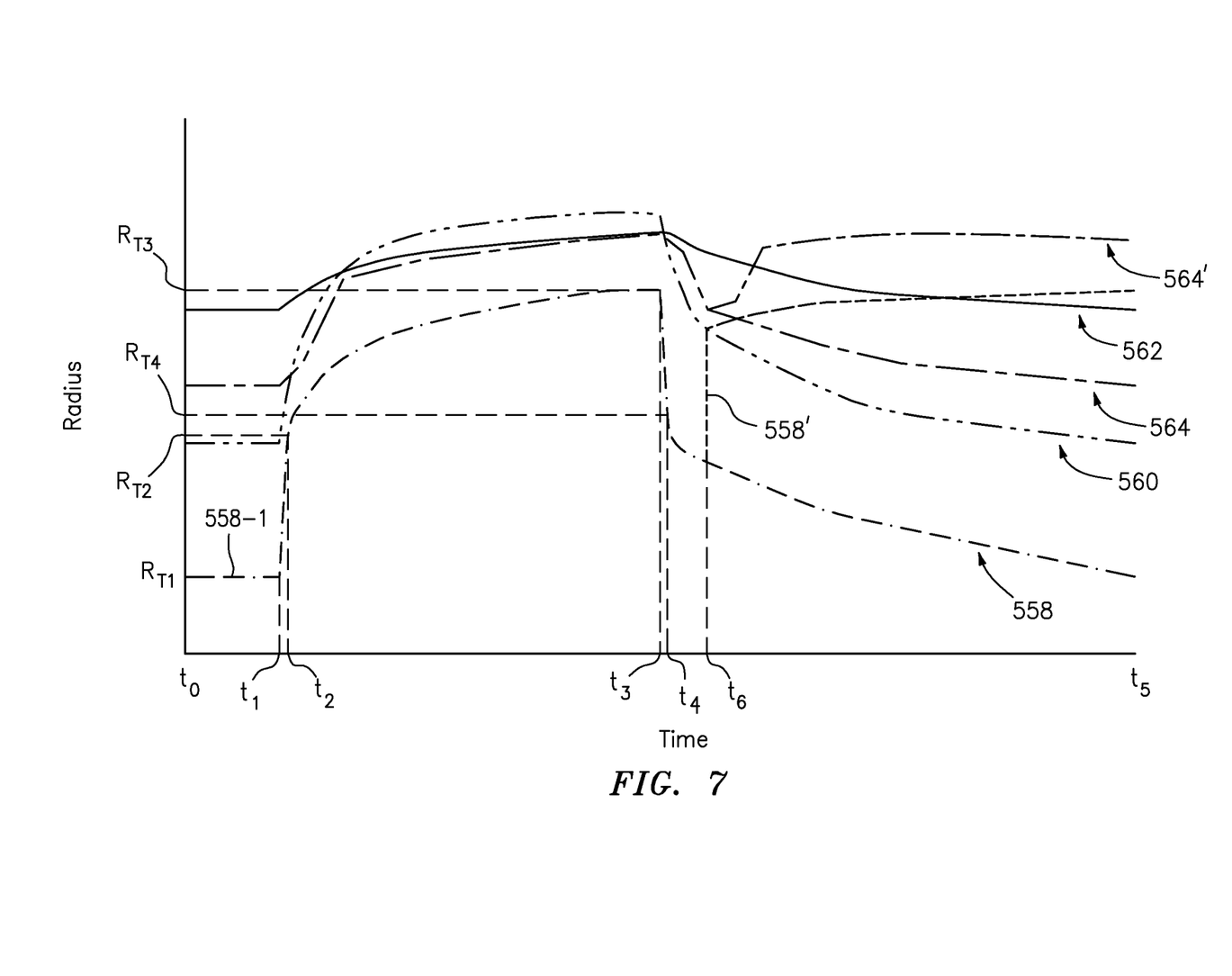
FIG. 7 is a plot of blade tip radius and BOAS radius vs. time.

For example, FIG. 7 shows a more detailed transient operational condition. The plot 558 shows the tip radius versus time. At an initial time $t_0$ the tip radius is at its idle condition $R_{TI}$. At $t_1$, the engines are throttled up to take-off power. In a very brief interval later, at $t_2$, the rotor is at full speed but has not reached its peak temperature. Accordingly, based largely upon the inertial/centrifugal forces the radius has expanded to $R_{T2}$. As the engine heats, the rate of thermal growth continues gradually decreasing as the engine approaches a steady-state take-off power condition. In this example, at $t_3$, as the engine nears what would be a steady-state take-off power condition, the tip radius is $R_{T3}$. Power is then rapidly dropped to idle power. There is initially a very sharp drop in radius to $R_{T4}$ at an approximate time $t_4$ wherein much of the initial/centrifugal component is eliminated (although not all because at higher temperature the effect of the centrifugal component is greater than it was at lower temperature). As the rotor cools, there is a further decrease in radius until $R_{TI}$ is again reached at approximately $t_5$.

In a variant transient, however, at time $t_6$ shortly after $t_4$, there is a rapid reacceleration (plot 558') which occurs almost instantaneously (e.g., its beginning and end times are not separately marked). This expands the tip radius up to $R_{T5}$. Thereafter, the remaining thermal expansion will bring the tips to the steady-state take-off power radius at or slightly beyond $R_{T3}$.

FIG. 7 also shows plots 560, 562, and 564 for the high CTE ring, low CTE ring, and hybrid ring, respectively responsive to the power profile plot 558. Due to the relatively quick cooldown after $t_5$, at $t_6$, the ring radius of the high CTE ring has shrunk sufficiently to have pinch with the reacceleration of plot 558'. The hybrid ring can avoid such pinch as is discussed below.

Figure 3:
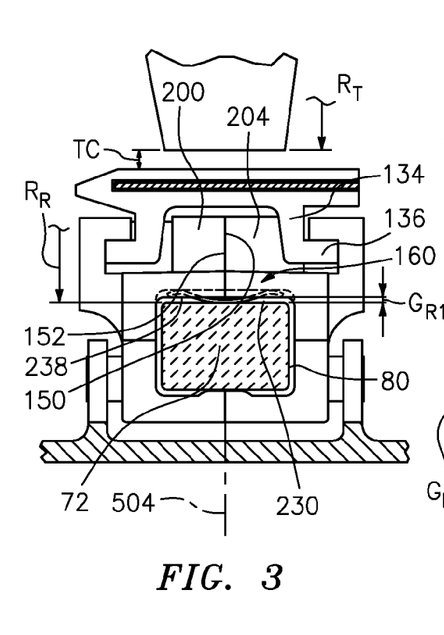
FIG. 3 is a radial/longitudinal sectional view of the stage of FIG. 2, taken along line 3-3.

A first example of a hybrid support ring 70 comprises two sub-units or members. One member 72 comprises or consists essentially of a low-CTE non-metallic member which forms an integral full hoop. More particularly, the exemplary member 72 forms a continuous (e.g. continuous microstructure rather than segments mechanically attached to each other) full hoop. The exemplary member 72, or at least its full hoop portion, is formed as a ceramic matrix composite. The exemplary member 72 has a generally rectangular axial/radial cross-section (e.g., a rectangle with rounded corners) formed by an inboard (radially) or inner diameter (ID) surface or face 74, an outboard (radially) or outer diameter (OD) surface or face 76, a forward/fore/upstream surface or face 78, and a rear/aft/downstream surface or face 80 (FIG. 3).

The exemplary CMC of the member 72 comprises a collection of silicon carbide fibers and mono-filament carbon/silicon carbide fibers preferentially woven in the hoop direction, with silicon carbide fibers woven in the axial and radial directions to create a fibrous pre-form. An interface coating on the fibers, (e.g., primarily boron nitride), may be applied to impart a weak interface bond. A glass-based matrix may be injected or hot-pressed into the fibrous perform to create a consolidated ring of essentially rectangular cross section. An external coating, such as an environmental barrier coating, may be applied to the exposed surfaces.

Figure 5:
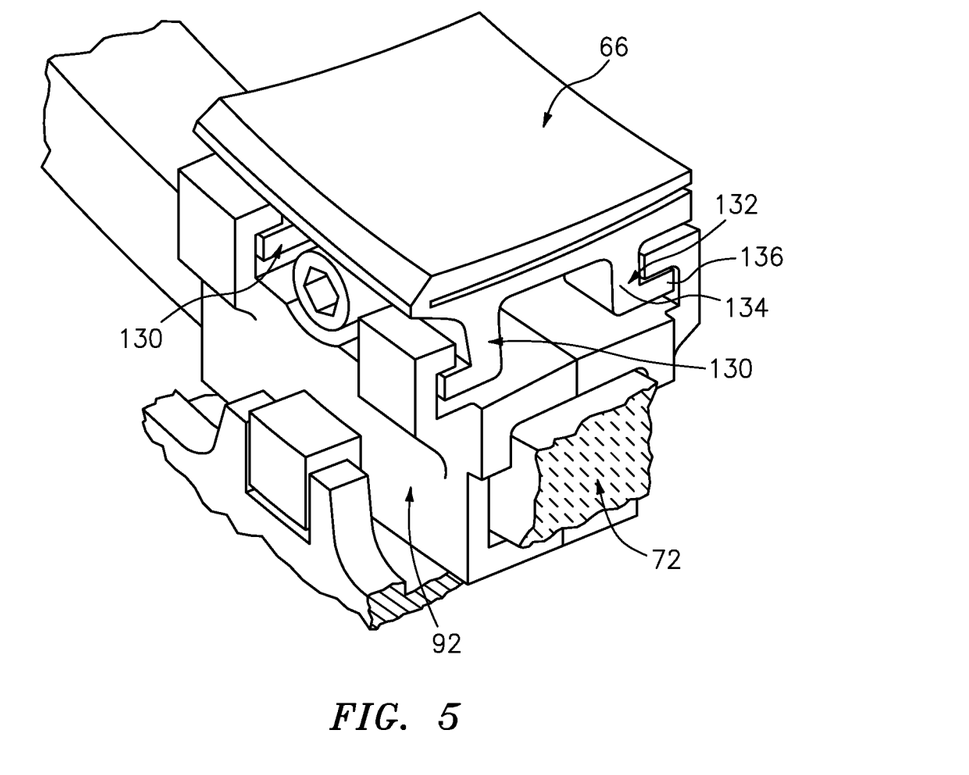
FIG. 5 is a view of a BOAS segment and carrier of the stage of FIG. 2 with a support ring member shown cut away.

Another sub-unit or member of the ring 70 is formed by a circumferential array 90 (carrier ring) (FIG. 2) of BOAS carriers 92 (FIG. 5). In the exemplary configuration, each BOAS carrier 92 carries a single associated BOAS segment 66. This is discussed further below. The carriers 92 mount the BOAS segments to the member 72. The carriers are formed of a high-CTE material (e.g., metal such as a nickel-based superalloy, although not necessarily at the high end of CTE for such alloys).

Each BOAS segment 66 comprises a main body 100 (FIG. 4) having an ID face 102 and an OD face 104. The main body 100 extends from a fore/forward/upstream end 106 to a rear/downstream/aft end 108 and has a first circumferential end/edge surface/face 110 (FIG. 2) and a second circumferential end/edge surface/face 112. Each of the circumferential ends 110 and 112 may bear a seal slot 114. With the array assembled, adjacent circumferential ends 110 and 112 of adjacent segments 66 come into facing alignment with each other and may receive corresponding edge portions of a seal 120 (e.g., a metallic feather seal). Outboard of the OD face 104, the segment 66 may include fore and aft mounting features 130 and 132 (FIG. 5). Exemplary mounting features are lugs or ears having a radially outward projecting proximal or leg portion 134 and an axially projecting distal portion 136 (e.g., projecting axially outward (forward for the forward lug 130 and aft for the aft lug 132)). Each exemplary segment may have a pair of such fore and aft lugs along each of the circumferential ends.

An exemplary BOAS segment may be formed of a cast nickel-based superalloy. The segment may have an internal cooling passage system (not shown) and may have a thermal barrier coating (not shown) (at least along the ID face). The exemplary BOAS segment may represent any of a number of known or yet-developed BOAS segment configurations.

As is discussed further below, the feather seal 120 (FIG. 2) spans a circumferential gap 122 (having a central radial/axial plane 502) between adjacent BOAS segments. The exemplary gap 122 has a width $W_1$ (e.g., measured as the minimum circumferential width at a given condition).

Each exemplary carrier 92 comprises a body (FIG. 4) formed as the assembly of a fore/front half 140 and an aft/rear half 142. The fore and aft halves may be secured to each other by one or more fasteners 144. The exemplary fastener 144 is formed as a single socket-head bolt.

In the exemplary carrier 92, the fore and aft halves 140 and 142 are generally symmetric across a transverse mating plane 504 which may form a transverse centerplane of the member 72. For example, the halves may at least depart from mirror images of each other by the presence of differing: fastening features (e.g., for cooperation with the bolt 144); and/or features for registering the halves with each other (e.g., lugs and mating pockets). Exemplary halves have respective faces 150 and 152 (FIG. 3) along the plane 504 abutting each other. The assembled carrier halves generally surround/encircle the axial cross-section of the member 72 to grasp the member 72 and secure the carrier to the member 72. Each exemplary carrier half comprises a portion 160 generally immediately radially inboard of the member 72 and wrapping slightly around to the adjacent fore or aft face of the member 72. Each portion 160 has an associated first circumferential end 162 (FIG. 2) and second circumferential end 164. Exemplary ends 162 and 164 form circumferential ends/extremes of the carrier so that the end 162 of each carrier is separated from the end 164 of the next adjacent carrier by a gap 170 having a width $W_2$.

Figure 4:
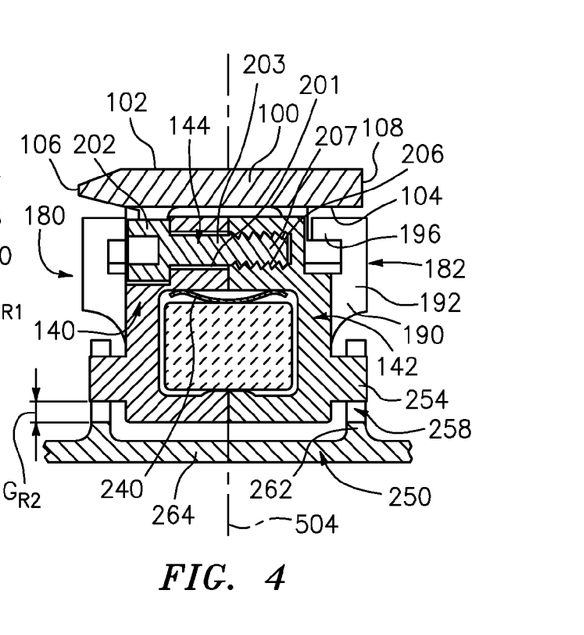
FIG. 4 is a radial/longitudinal sectional view of the stage of FIG. 2, taken along line 4-4.

For capturing the BOAS segment, the exemplary carrier halves have respective fingers 180 and 182 (FIG. 4). Each half has a pair of such fingers 180 or 182 spaced slightly circumferentially inward of the ends 162 or 164. Each finger has a proximal portion 190 extending longitudinally outward from a root portion adjacent thereto. An intermediate portion 192 extends radially inward from the proximal portion 190. A distal portion 196 extends axially inward from the inboard end of the intermediate portion. Each of these fingers thus interfits and cooperates with an associated mounting lug 130 or 132 of the blade outer air seal.

A central inboard portion of each half has fastening features cooperating with the fastener 144 for securing the two halves together. For example, a central inboard portion 200 (FIGS. 3 and 4) of the first half 140 has a counterbored compartment 201 receiving the head 202 and an intermediate portion 203 of the fastener 144 while the corresponding portion 204 of the second half has a threaded bore 206 receiving a threaded end portion 207 of the fastener. The exemplary BOAS segment bridges these central inboard portions 200, 204 with mounting lugs 130 or 132 falling on either circumferential side of the associated central portion. This bridging circumferentially retains the BOAS segment to the carrier.

In operation, the engine heats up. As the engine heats up, its components thermally expand due to their coefficients of thermal expansion (CTE). FIG. 2 shows tips 220 of the blades 62 at a tip radius $R_T$ from the engine centerline 500. The ID faces 102 of the BOAS segment bodies are at a radius $R_S$ so that the difference between $R_S$ and $R_T$ is a tip clearance shown as TC. FIG. 3, further, shows a radial gap 230 between the ID face 74 of the ring 72 at a radius $R_R$ from the centerline and the adjacent inner face 238 of the aperture in the carrier receiving the ring. This gap has a radial span of $G_{R1}$. The separateness of the carrier segments will otherwise allow the gap 230 to close when the associated segments shift radially outward. To bias the gap open, an exemplary compliant member 240 (FIG. 4) is shown as a circumferential segment of metallic wave spring received in a radially-inwardly extending compartment in the carrier and engaging the ring surface 74. As is discussed below, sufficient force may, however, compress the spring 240 and close the gap 230.

The exemplary array 64 of BOAS segment 66 along with the support ring structure is supported/carried by the engine case 250 (FIG. 4). To do this, each carrier has a pair of lugs shown as a front/fore/forward lug 252 (FIG. 2) and a rear/aft lug 254 (FIG. 4). The respective fore and aft lugs extend from the respective fore and aft halves of the carrier body. The lugs are received in respective channels 256, 258 in radially-inwardly extending webs 260, 262 of the case 250 extending radially inward from a sidewall 264 of the case. FIG. 2 shows lateral circumferential gaps 270 between sides 272 and 274 of each lug 252 and associated sides 276, 278 of the channel. These are exaggerated. They may be just small enough to avoid binding over the operational range while maintaining concentricity of the support ring and the engine case as well as rotor axis/centerline 500. Additionally, a radial gap 280 is shown between an outboard/OD end 282 of the lug and a base 284 of the channel. The gap 280 has a radial span $G_{R2}$ (FIG. 4).

The engine may have a characteristic temperature which will generally increase with engine speed and power. An exemplary temperature range may be characterized from a low of $T_O$ (e.g., at or below 200 C) to a high of $T_H$ (e.g., at least 550 C). As the temperature of the member 72 increases, it will circumferentially expand, thereby, causing a corresponding radial expansion. This radial expansion will tend to at least partially counter any thermal and centrifugal expansion of the blade/rotor system which would close the tip clearance gap. An initial stage of such expansion is shown by 554-1 in FIG. 6. Due to the relatively low thermal expansion of the CMC material of the member 72, its expansion may be insufficient to fully counter blade/disk expansion. Accordingly, an additional stage of expansion may be provided by appropriate configuration of the carriers.

The carrier material may have a higher CTE than the CMC. With increasing temperature, the carrier material will expand more than the CMC. With increasing temperature, the greater thermal expansion of the carrier will cause the gaps 170 to shrink (not merely in angular extent but in linear dimensions).

Eventually, at a characteristic engine temperature $T_1$, associated with $P_1$ in FIG. 6, the circumferential gaps will fully close (an "initial lock-up" condition). Until this point, in a first stage of the heating and speed increase, radial expansion has essentially been due to the circumferential expansion of the CMC member 72 (e.g., the member 72 alone has an effective weighting to account for at least 80% of the expansion; as a practical matter, the example would be 100%). With further increases in temperature, the carrier ring 90 will tend to expand according to its CTE. This creates a second stage of thermal expansion (see intermediate stage 554-2 of FIG. 6) wherein radial expansion is dictated essentially or substantially by the carrier ring 90 and its CTE.

For example, if there is a relatively light radial compliance between the carriers and the member 72, expansion of the carrier ring against the compliant force (e.g., of springs 240) will progressively close the radial play between the carriers and the member 72 and the expansion will essentially be due to the carriers alone. With such lighter compliance, the carrier ring 90 will essentially dictate further thermal expansion during the stage 554-2 (with the member 72 playing no significant role (e.g., substantially less than 20% and likely less than 5%). With much heavier compliance, the member 72 may go into noteworthy circumferential tension placing the carrier ring 90 in corresponding circumferential compression and somewhat countering its expansion. Thus, such a heavy compliance stage may be substantially influenced by the properties of both the carrier ring 90 and the member 72 (e.g., with each of the two members having a weighted average contribution of at least 20%).

With further thermal expansion at an exemplary engine temperature $T_2$ associated with $P_2$ the radial play is closed (entering the stage 554-3 of FIG. 6) and further increase in temperature produces more significant circumferential tension on the member 72 and compression on the carrier ring 90. The properties of both may substantially dictate further expansion subject to the specific properties and their relative sizes. For example, if the longitudinal cross-section of the member 72 is relatively large, its influence will be correspondingly large.

In certain possible configurations, $T_1$ and $T_2$ may be the same so that the second interval is non-existent. In other possible configurations, dimensions may be such that the play essentially never closes and the third interval does not exist.

Additional considerations involve non-equilibrium operation of the hybrid ring. These can be more complex than behavior of a single-material ring. One area is hysteresis and differences in behavior on heating vs. cooling. In the identified example, on heating, the high thermal conductivity of the high CTE member causes it to heat up at a higher rate than had it been made of a low CTE material. However, on cooldown, the high CTE material will cool relatively faster. The low CTE ring thus serves to slow shrinkage of the BOAS radius in decreasing power situations, thereby protecting against pinch/rub in rapid reacceleration situations. This is seen in FIG. 7 by the slight rightward offset of plot 564 from plot 560 after $t_4$. Also, the reacceleration at $t_6$ begins to reheat the support ring. There is a brief interval after $t_6$ (the initial departure of 564' from 564) where the carriers have not yet locked up and shallow expansion is due to expansion of the CMC. When the carriers lock up, their CTE then dictates expansion along the steepened part of 564' until the locked carrier ring either nears equilibrium or interferes with the CMC.

The benefit is shown in FIG. 7, plot 564' whereupon a re-acceleration the turbine rotor growth is less than the radial position of the BOAS. Thus no detrimental contact between the blade tip and the BOAS occurs. As the turbine rotor continues to grow as it gets hotter, the control ring 72 has kept the carriers 92 at a larger radius, and delays the initiation of the lockup. Once the carriers are hot enough, lockup ensues, and the ring quickly moves back towards it's steady state radius.

A noteworthy difference is the small difference in the radial position of the BOAS during this transient phenomenon. The slow responding ring 72 forces the carriers 92 to be held at a larger radius during the transient deceleration and cool-down phase, even as they un-lock. The small, extra residual outward radial displacement constraint, typically 0.005-0.020 inch (0.13-0.5 mm) provide enough of a difference between the hybrid assembly and the high CTE ring that the transient pinch rub event does not occur, and no longer becomes the limiter for turbine tip clearance.

Such a result may not likely be obtainable with a high CTE control ring. Nor is it apparently obtainable on a bonded bi-material ring (because the cool-down phase would cause the high thermal conductivity/CTE inner portion to pull away from the low CTE outer portion, thus the deceleration pinch point is similar to the high CTE ring. Additionally, if one were to try to counteract this effect, large radial tensile loads would have to be carried between the outer low CTE ring and the high CTE inner ring, with significant structural challenge of the restraint features and/or fasteners. In the hybrid design, the segmented carriers 92 solve this problem because they can be held outward by the ring 72 even as they unlock, and do not create any extra force on the ring 72.

In yet an alternative embodiment, the carriers directly abut at the initial speed. Effectively, the carriers (at least initially) behave as if they were an integral structure. In such a situation, the initial stage of thermal expansion is dictated by the CTE of the carrier while the radial play between carrier and member 72 closes. There may be sub-variations based upon the presence and properties of any springs or other radial compliance. After closing of the play, the properties of both the carrier and the member 72 are involved reflecting their relative sizes. However, hysteresis described above opens up the possibility that the carriers could separate on rapid cooling (e.g., quick deceleration) thereby creating a temporary cooldown-only situation wherein only the CMC member dictates BOAS radial position.

The carriers could be integrated (e.g., via carrier-to-carrier fastening) or could be unitarily formed as a continuous full annulus (e.g., wherein fore and aft carrier halves become full rings). There may be sub-variations based upon the presence and properties of any springs or other radial compliance. Such examples may further be divided into situations where there is an initial radial gap vs. situations without such a gap. Again, hysteresis opens up the possibility that a gap develops only transiently on rapid cooldown, thereby creating a temporary cooldown-only situation where only the high CTE material dictates BOAS radial position.

One or more embodiments have been described. Nevertheless, it will be understood that various modifications may be made. For example, when implemented in the remanufacture of the baseline engine or the reengineering of a baseline engine configuration, details of the baseline configuration may influence details of any particular implementation. Accordingly, other embodiments are within the scope of the following claims.

What is claimed is:

1. An engine comprising:
 a blade stage;
 a circumferential array of blade outer air seal segments; and
 a support ring carrying the blade outer air seal segments and comprising:
  a full hoop non-metallic member; and
  a metallic member intervening between the blade outer air seal segments and the non-metallic member.

2. The engine of claim 1 wherein the metallic member and non-metallic member have dimensions and physical properties so that:
 over an operational temperature range there are distinct stages in which the circumferential thermal expansion of one member versus the other dictate radial expansion of the circumferential array of blade outer air seal segments.

3. The engine of claim 2 wherein the distinct stages include:
 a stage in which the circumferential thermal expansion of the non-metallic member alone essentially dictates said radial expansion; and
 a stage in which the circumferential thermal expansion of the metallic member as resisted by the non-metallic member essentially dictates said radial expansion.

4. The engine of claim 3 wherein the distinct stages include:
 a stage in which the circumferential thermal expansion of the metallic member alone essentially dictates said radial expansion.

5. The engine of claim 1 wherein:
 the blade stage is a turbine stage.

6. The engine of claim 1 wherein:
 the metallic member comprises a nickel-based superalloy; and
 the non-metallic member comprises a ceramic matrix composite.

7. The engine of claim 1 wherein:
 the metallic member comprises an integral full hoop; and
 the non-metallic member comprises an integral full hoop.

8. The engine of claim 1 wherein:
 the metallic member has a CTE of 3.0-4.0 ppm/C; and
 the non-metallic member has a CTE of 0.5-2.0 ppm/C.

9. The engine of claim 1 wherein:
 the metallic member comprises a circumferential array of edge-to-edge segments.

10. The engine of claim 9 wherein each of the edge-to-edge segments comprises:
 a forward half; and
 an aft half secured to the forward half to capture the non-metallic member and capture an associated one of the blade outer air seal segments.

11. The engine of claim 1 wherein the metallic member and non-metallic member have dimensions and physical properties so that:
 as a temperature increases from a first temperature of less than 200 C to a second temperature of at least 550 C there are distinct stages in which the physical properties of one member versus the other dictate radial expansion of the circumferential array of blade outer air seal segments.

12. A method for operating the engine of claim 1 comprising:
 running the engine in a range from a first condition to a second condition, a characteristic inner diameter of the blade outer air seal array increasing from a first diameter to a second diameter due to thermal expansion of the support ring wherein:
  in a first portion of the range, the expansion is dictated essentially by one of the metallic member and non-metallic member but not the other; and
  in a second portion of the range, the thermal expansion is dictated substantially by the other.

13. The method of claim 12 wherein:
 the first portion of the range is at lower temperature than the second portion of the range;
 in the second portion of the range, the metallic member essentially dictates the thermal expansion and a radial gap between the metallic member and non-metallic member decreases with increasing temperature; and
 in the first portion of the range, the thermal expansion is substantially dictated by the non-metallic member.

14. The method of claim 12 wherein:
 in the first portion of the range, an edge-to-edge clearance between segments of the metallic member decreases with temperature and the non-metallic member essentially dictates the thermal expansion; and
 in the second portion of the range, the edge-to-edge clearance is closed.

15. A method for operating the engine of claim 1 comprising:
 an acceleration of the engine from a first speed to a second speed during which segments of the metallic member engage each other; and
 a deceleration of the engine from the second speed to the first speed during which the segments of the metallic member decouple from each other at a larger radius than a radius at which they originally engaged each other; and a reacceleration wherein the segments of the metallic member reengage each other while still at a larger radius that the radius at which they originally engaged each other.

16. An engine comprising:
a blade stage;
a circumferential array of blade outer air seal segments; and
a support ring carrying the blade outer air seal segments and comprising:
  a non-metallic member;
  a metallic member intervening between the blade outer air seal segments and the non-metallic member; and
  a radially compliant member between the metallic member and the non-metallic member.

17. The engine of claim 16, wherein:
the radially compliant member comprises a plurality of springs.

18. An engine comprising:
an engine case;
a blade stage;
a circumferential array of blade outer air seal segments; and
a support ring carried by the engine case and carrying the blade outer air seal segments and comprising:
  a full annulus member; and
  a segmented member intervening between the blade outer air seal segments and the full annulus member,
wherein the segmented member and full annulus member have dimensions and physical properties so that:
  in a first portion of an operational temperature range, an edge-to-edge clearance between segments of the segmented member decreases with temperature and the full annulus member essentially dictates the thermal expansion; and
  in the second portion of the operational temperature range, the edge-to-edge clearance is closed and a radial gap between the segmented member and full annulus member decreases with increasing temperature.

19. The engine of claim 18 wherein:
the segmented member comprises a nickel-based superalloy; and
the full annulus member comprises a CMC or a gamma titanium.

20. The engine of claim 18 wherein the segmented member is metallic and the full annulus member is nonmetallic.

21. An engine comprising:
an engine case;
a blade stage;
a circumferential array of blade outer air seal segments; and
a support ring carried by the engine case and carrying the blade outer air seal segments and comprising:
  a full annulus member; and
  a segmented member intervening between the blade outer air seal segments and the full annulus wherein the segmented member and full annulus member have dimensions and physical properties so that:
    over an operational temperature range there are distinct stages in which the circumferential thermal expansion of one member versus the other dictate radial expansion of the circumferential array of blade outer air seal segments; and
    over a portion of the operational temperature range, a radial gap between the segmented member and full annulus member decreases with increasing temperature.

22. An engine comprising:
an engine case;
a blade stage;
a circumferential array of blade outer air seal segments; and
a support ring carried by the engine case and carrying the blade outer air seal segments and comprising:
  a full annulus member;
  a segmented member intervening between the blade outer air seal segments and the full annulus member; and
  a radially compliant member between the segmented member and the full annulus and biasing open a radial gap between the segmented member and the full annulus member.

23. An engine comprising:
an engine case;
a blade stage;
a circumferential array of blade outer air seal segments; and
a support ring carried by the engine case and carrying the blade outer air seal segments and comprising:
  a full annulus member; and
  a segmented member intervening between the blade outer air seal segments and the full annulus member and supported by the engine case to, in turn, support the full annulus member.

24. The engine of claim 23 wherein:
the support ring is carried by the engine case by lugs received in channels and for each lug and associated channel there being a radial gap between the lug and a base of the channel.

25. An engine comprising:
an engine case;
a blade stage;
a circumferential array of blade outer air seal segments; and
a support ring carried by the engine case and carrying the blade outer air seal segments and comprising:
  a full annulus member expandably and contractably supported relative to the engine case; and
  a segmented member intervening between the blade outer air seal segments and the full annulus member, wherein there is a radial gap between the segmented member and the full annulus member.

26. The engine of claim 25 wherein:
the support ring is carried by the engine case by lugs received in channels and for each lug and associated channel and wherein the radial gap is between the lug and a base of the channel.

* * * * *